(12) United States Patent
Tepper

(10) Patent No.: US 11,187,280 B2
(45) Date of Patent: Nov. 30, 2021

(54) FRICTION PART

(71) Applicant: Schaeffler Technologies AG & Co. KG, Herzogenaurach (DE)

(72) Inventor: Philipp Tepper, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/772,992

(22) PCT Filed: Nov. 20, 2018

(86) PCT No.: PCT/DE2018/100947
§ 371 (c)(1),
(2) Date: Jun. 15, 2020

(87) PCT Pub. No.: WO2019/120370
PCT Pub. Date: Jun. 27, 2019

(65) Prior Publication Data
US 2020/0393004 A1     Dec. 17, 2020

(30) Foreign Application Priority Data
Dec. 18, 2017   (DE) .......................... 102017130368.5

(51) Int. Cl.
*F16D 13/64* (2006.01)
*F16D 13/72* (2006.01)
*F16D 69/00* (2006.01)

(52) U.S. Cl.
CPC .............. *F16D 13/64* (2013.01); *F16D 13/72* (2013.01); *F16D 2069/004* (2013.01); *F16D 2069/009* (2013.01)

(58) Field of Classification Search
CPC .......... F16D 13/64; F16D 13/72; F16D 13/74; F16D 2069/004; F16D 2069/009; F16D 2300/10
See application file for complete search history.

(56) References Cited

U.S. PATENT DOCUMENTS 3,972,400 A * 8/1976 Howells .................. F16D 13/60
192/107 R
8,424,664 B2   4/2013 Fabricius et al.
(Continued)

FOREIGN PATENT DOCUMENTS

CN     103939491 A    7/2014
DE     2353133 A1     5/1974
(Continued)

*Primary Examiner* — Mark A Manley

(57) ABSTRACT

A frictional part for a frictionally operating device includes friction lining pieces, which are spaced apart from one another to form an annular disc-like friction surface having grooves, and the friction lining pieces have the shape of triangles and pentagons. The pentagonal friction lining pieces may be provided with a radially inward or outward directed top and may be intrinsically symmetrical with respect to a radial. The pentagonal friction lining pieces may be oriented with the tops thereof alternating radially inward and radially outward. The triangular friction lining pieces may have the shape of acute-angled or right-angled triangles having one short and two longer sides. The triangular friction lining pieces may each have a longest side which is arranged radially inward or radially outward. The pentagonal friction lining pieces may each be arranged in the circumferential direction between four triangular friction lining pieces.

15 Claims, 2 Drawing Sheets

(56) References Cited

U.S. PATENT DOCUMENTS 9,022,183 B2    5/2015  Bill
10,316,901 B2 * 6/2019  Zhang ................... F16D 13/648

FOREIGN PATENT DOCUMENTS

| | | |
|---|---:|---|
| DE | 4432624 C1 | 4/1996 |
| DE | 69403135 T2 | 8/1997 |
| DE | 10157483 A1 | 6/2003 |
| DE | 10342271 A1 | 4/2005 |
| DE | 102005029509 A1 | 1/2006 |
| DE | 102006009565 A1 | 9/2006 |
| DE | 102010021900 A1 | 12/2011 |
| DE | 102012014804 A1 | 1/2014 |
| DE | 102012014811 A1 | 1/2014 |
| DE | 102013011677 A1 | 1/2015 |
| DE | 102015214469 A1 | 2/2017 |
| DE | 202017106198 U1 | 10/2017 |
| DE | 102013226393 A1 | 6/2020 |
| EP | 0486693 A1 | 5/1992 |
| EP | 1731784 A1 | 12/2006 |
| JP | 11336805 A | 12/1999 |
| WO | 2017080689 A1 | 5/2017 |

* cited by examiner

FRICTION PART

CROSS-REFERENCE TO RELATED APPLICATIONS

This application is the United States National Phase of PCT application. No. PCT/DE2018/100947 filed Nov. 20, 2018, which claims priority to German Application No. DE102017130368.5 filed Dec. 18, 2017, the entire disclosures of which are incorporated by reference herein.

TECHNICAL FIELD

The invention relates to a frictional part for a frictionally operating device, having friction lining pieces that are spaced apart by grooves from one another to represent an annular disc-like friction surface.

BACKGROUND

From the German published patent application DE 10 2015 214 469 A1, a frictional part for a frictionally operating device having friction lining pieces is known that are spaced apart from one another by grooves to represent an annular disc-like friction surface, wherein individual or all friction lining pieces have the shape of triangles.

From the German published patent application DE 10 2012 014 811 A1 a frictional part for a frictionally operating device having an annular friction surface is known, which has an inner edge and an outer edge. In the friction surface, an inner circumferential groove, an outer circumferential groove and at least one intermediate circumferential groove are arranged in the radial direction between the inner and the outer circumferential groove, which each extend in a zigzag or wave shape between inner and outer deflection points. A flow connection is provided between the inner edge and the inner circumferential groove, between the circumferential grooves adjacent to one another and between the outer circumferential groove and the outer edge. The frictional part has a friction lining carrier, and the friction surface is formed by a friction lining, preferably a paper friction lining, applied to the friction lining carrier and consisting of a plurality of friction lining segments spaced apart from one another, between which the circumferential grooves and the inner and/or outer edge grooves, if necessary also the intermediate grooves, are formed.

A similar frictional part is known from the German published patent application DE 10 2012 014 804 A1, wherein connecting grooves extending along a radial or/and the connecting grooves are straight.

From the German patent specification DE 101 57 483 C2, a shaped body of fiber-reinforced ceramic composites is known, with a core zone and at least one cover layer which has a higher coefficient of thermal expansion than the core zone. The top layer is a silicon-carbon-rich top layer having a mass proportion of silicon carbon of at least thirty percent and is composed of segments which are separated from one another by regions free of top layer material in the form of joints or by webs of a material other than the material of the top layer.

From the German published patent application DE 10 2006 009 565 A1, a brake disc is known to have at least one annular friction surface, preferably provided on both outer sides, against which a brake lining can be pressed for braking. The friction surface consists of a plurality of partial segments at least partially separated from one another by expansion joints, and the depth of the expansion joints is greater than the permissible degree of wear of the friction surface.

From the German published patent application DE 2 353 133, a friction disc, in particular for the use of clutches and disc brakes, is known. The disc is formed of five layers. The first layer consists of friction material, the second layer of a material with a low modulus of elasticity for compression, the third layer of a core of high strength, the fourth layer of a material with a low modulus of elasticity for compression and the fifth layer of friction material. The friction material of the first and fifth layer consists of a large number of individual pieces.

The German patent specification DE 103 42 271 B4 discloses a friction lining plate for a wet-running frictional shift element, having at least one annular disc-like friction surface serving for frictional engagement with grooves through which coolant flows from the inner diameter of the friction surface. The grooves form two overlapping groove sets, the friction lining plate can be rotated in the installed state without a preferred direction of rotation, and the friction surface has no groove edges aligned perpendicular to the direction of rotation.

SUMMARY

Example embodiments broadly comprise a frictional part for a frictionally operating device, having friction lining pieces which are spaced apart from each other to form a annular disc-like friction surface having grooves. The friction lining pieces have the shape of triangles and pentagons. The corners of the triangles and pentagons can be sharp, blunt or rounded. The grooves between the friction lining pieces run essentially radially from radially inward to radially outward. However, essentially radial also means that the grooves do not need to run exactly radially. According to an exemplary embodiment, the grooves are even deliberately arranged more or less obliquely to radials. For example, the grooves that run along the pentagonal friction lining pieces are arranged at an angle of ten to thirty degrees obliquely to a radial. The grooves, which are delimited by two triangular friction lining pieces, are for example arranged at an angle of between thirty and eighty degrees to a radial. The triangular and pentagonal friction lining pieces are arranged and spaced apart from one another in such a way that a special groove pattern results.

An exemplary embodiment of the frictional part is characterized in that the pentagonal friction lining pieces are equipped with a radially inward or outward top and, in relation to a radial, are intrinsically symmetrical. The pentagonal friction lining pieces have the shape of a pentagon with a short base side facing away from the top and from which two long sides extend. The long sides are arranged at an angle of about five to twenty degrees to a radial and, relative to the axis of symmetry, run diagonally outward from the short bottom side. The axis of symmetry is represented by a radial, which is also a perpendicular to the short base of the pentagon. The ends of the long sides facing away from the short base side are connected to the top of the pentagon by two short leg sides. The two short leg sides enclose an angle that is greater than ninety degrees and is arranged opposite the short base side of the pentagon. If the short base side is arranged radially inward, the top of the pentagon is directed radially outward. If the short base side of the pentagon is located radially outward, then the top of the pentagon is directed radially inward.

Another exemplary embodiment of the frictional part is characterized in that the pentagonal friction lining pieces with the tops thereof are alternately aligned radially inward and radially outward. The short base sides of the pentagonal friction lining pieces are then alternately arranged radially outward and radially inward.

Another exemplary embodiment of the frictional part is characterized in that the triangular friction lining pieces have the shape of acute-angled or right-angled triangles having one short and two longer sides. The longest sides of the right-angled or acute-angled triangles are arranged radially inward or radially outward. The short sides of the triangular friction lining pieces face the long sides of the pentagonal friction lining pieces.

Another exemplary embodiment of the frictional part is characterized in that the triangular friction lining pieces each have a longest side which is arranged radially inward or radially outward. The other long sides of the triangular friction lining pieces are advantageously facing one another.

Another exemplary embodiment of the frictional part is characterized in that the pentagonal friction lining pieces are each arranged in the circumferential direction between four triangular friction lining pieces. Two triangular friction lining pieces are attached in the circumferential direction between two pentagonal friction lining pieces.

Another exemplary embodiment of the frictional part is characterized in that two of the four triangular friction lining pieces with the tops thereof face the pentagonal friction lining piece, while the other two of the four triangular square friction lining pieces with the short sides thereof face the pentagonal friction lining piece. The first-mentioned triangular friction lining pieces, the tops of which face the pentagonal friction lining piece, are advantageously arranged radially outward. Then the second-mentioned triangular friction lining pieces, which face the pentagonal friction lining piece with the short sides thereof, are advantageously arranged radially inward.

Another exemplary embodiment of the frictional part is characterized in that a branched region is provided radially inward, from which two grooves start and which is delimited by two triangular friction lining pieces and one pentagonal friction lining piece. This can improve the cooling behavior during operation of the frictional part.

Another exemplary embodiment of the frictional part is characterized in that a connection region is provided radially outward, in which two grooves meet and which is delimited by two triangular friction lining pieces and one pentagonal friction lining piece. This can further improve the cooling behavior during operation of the frictional part.

The frictionally operating device in which the disclosed frictional part is used may be a wet-running friction clutch or friction brake. The wet-running friction clutch or friction brake comprises at least one support element to which the triangular and pentagonal friction lining pieces are fastened in the special groove pattern. The friction lining pieces can be attached to the carrier element on both sides. The carrier element is, for example, a support plate. The grooves between the friction lining pieces allow fluid to pass from radially inward to radially outward for cooling purposes.

The support element can be made in one part or in several parts. The support element, for example designed as a support plate, has essentially the shape of an annular disc. Radially inward or radially outward, the support element is provided with a form-fitting geometry, for example a toothing, which serves to represent a rotationally fixed connection between the frictional part and another component, for example a plate carrier. The frictional part is rotatable about an axis of rotation. The term radial refers to an axis of rotation of the frictional part.

Radial means transverse to the axis of rotation. Analog means axially in the direction or parallel to the axis of rotation of the frictional part. In the axial direction, the frictional part, having two friction surfaces facing away from one another, for example, is arranged between two plates, in particular two clutch plates or brake plates. The clutch plates or brake plates can be moved in the axial direction relative to the frictional part arranged therebetween in order to connect the plates frictionally having the frictional part arranged therebetween for torque transmission. This enables the transmission of a torque of an inner/outer plate carrier, which is connected in a rotationally fixed manner to the clutch plates, to an outer/inner plate carrier, which is connected in a rotationally fixed manner to the frictional part.

The disclosure optionally also relates to a wet-running multi-plate clutch or multi-plate brake having frictional parts described above.

The disclosure further relates to a groove pattern with a specific groove geometry, shown on the frictional part described above having the triangular and pentagonal friction lining pieces. The possible use or the scalability and the performance of the frictional part in operation can be improved by the claimed groove pattern. Conventional pure triangular patterns having alternately arranged horizontally mirrored triangular friction lining pieces, which have approximately the same shape and size, can only be used to a limited extent or only for a certain geometry of plates due to the size of the friction lining pieces, also known as pads.

In particular, the disclosed groove pattern can prevent the undesired occurrence of a floating effect during operation of the frictional part. By adjusting the various angles, the pitch and the triangular and pentagonal shape of the friction lining pieces, a high degree of flexibility or scalability is provided, so that the claimed groove pattern can be used with a wide range of plate dimensions and friction combinations. The friction pairings are influenced, for example, by the lining, by a steel plate surface and/or by the properties of the fluid, especially oil properties.

BRIEF DESCRIPTION OF THE DRAWINGS

Further advantages, features and details of the disclosure result from the following description, in which various exemplary embodiments are described in detail with reference to the drawings. In the figures.

DETAILED DESCRIPTION

Figure 1:
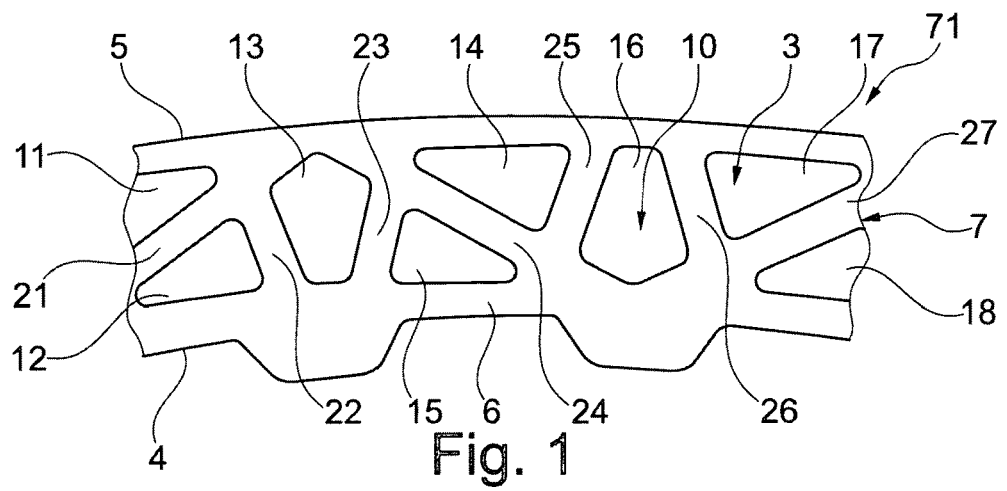
FIG. 1 shows a frictional part having triangular and pentagonal friction lining pieces spaced apart to represent grooves and arranged in a basic groove pattern, as seen in a plan view of an annular disc-like friction surface.

FIGS. 1 to 5 show design examples of a frictional part 71; 72; 73; 74; 75 in a plan view of a friction lining 3. The frictional part 71; 72; 73; 74; 75 comprises a support element 6, which is designed as a support plate. A friction lining 3 is fastened to the support element 6 and serves to represent a friction surface 10. Two identically designed friction linings are attached to the support element 6 and serve to represent friction surfaces facing away from one another.

The friction lining 3 essentially has the shape of an annular disc 7, which is delimited radially inward by an inner radius 4 and radially outward by an outer radius 5. Radially inward, the support element 6 has an internal toothing 8. The internal toothing 8 serves to represent a rotationally fixed connection having a plate carrier (not shown) of a (also not shown) multiplate clutch.

The friction lining 3 comprises a plurality of friction lining pieces 11 to 18, which are designed and spaced apart from one another in such a way that grooves 21 to 27 result between the friction lining pieces 11 to 18, which allow fluid, in particular oil, for example cooling oil, to pass therethrough. The cooling oil is advantageously supplied internally, i.e., at the inner radius 4, flows through the grooves 21 to 27 and exits radially outward, i.e., at the outer radius 5, of the friction lining 3.

The friction lining pieces 11, 12, 14, 15 and 17, 18 have the shape of triangles. The friction lining pieces 13 and 16 have the shape of pentagons.

The pentagonal friction lining piece 13 is arranged in the circumferential direction between the four triangular friction lining pieces 11, 12 and 14, 15. The pentagonal friction lining piece 16 is arranged in the circumferential direction between the four triangular friction lining pieces 14, 15 and 17, 18.

The pentagonal friction lining pieces 13 and 16 each have a short base side from which two long sides extend. Short leg sides start from the free ends of the long sides and meet in a top of the pentagon. A mid-perpendicular to the short side of the pentagon represents an axis of symmetry, which is a radial that also runs through the top of the pentagon. The long sides are angled outwards to the radial, so that the pentagon extends from the short base side.

The angles between the long sides and the short base of the pentagon are greater than ninety degrees, but less than one hundred and twenty degrees. The angles between the long sides and the short leg sides of the pentagon are also greater than ninety degrees and less than one hundred and twenty degrees. The angle enclosed at the top of the pentagon by the two short sides of the legs is greater than ninety and less than one hundred and thirty degrees.

The top of the pentagonal friction lining piece 13 is directed radially outward. The top of the pentagonal friction lining piece 16 is directed radially inward. The short base side of the pentagonal friction lining piece 13 is arranged radially inward. The short base side of the pentagonal friction lining piece 16 is arranged radially outward.

The groove 21 is delimited by the two triangular friction lining pieces 11 and 12. The groove 12 is delimited by the triangular friction lining piece 12 and the pentagonal friction lining piece 13. The groove 23 is delimited by the pentagonal friction lining piece 13 and the triangular friction lining piece 15.

The groove 24 is delimited by the triangular friction lining pieces 14 and 15. The groove 25 is formed by the triangular friction lining piece 14 and delimited by the pentagonal friction lining piece 16. The groove 26 is delimited by the pentagonal friction lining piece 16 and the triangular friction lining piece 17. The groove 27 is delimited by the two triangular friction lining pieces 17 and 18.

The grooves 22 and 23 run along the long sides of the pentagonal friction lining piece. The grooves 25 and 26 run along the long sides of the pentagonal friction lining piece 16. A short side of the triangular friction lining piece faces the pentagonal friction lining piece 13. A top of the triangular friction lining piece 11 faces the pentagonal friction lining piece 13.

A short side of the triangular friction lining piece 15 faces the pentagonal friction lining piece 13. A top of the triangular friction lining piece faces the pentagonal friction lining piece 13. A short side of the triangular friction lining piece 14 faces the pentagonal friction lining piece 16.

A top of the triangular friction lining piece 15 faces the pentagonal friction lining piece 16. A short side of the triangular friction lining piece 17 faces the pentagonal friction lining piece 16. A top of the triangular friction lining piece 18 faces the pentagonal friction lining piece 16.

The grooves 21 to 24, which are shown with the friction lining pieces 11 to 18, are arranged in a basic groove pattern in FIG. 1. FIGS. 2 to 5 show modifications of this basic groove pattern shown in FIG. 1.

Figure 2:
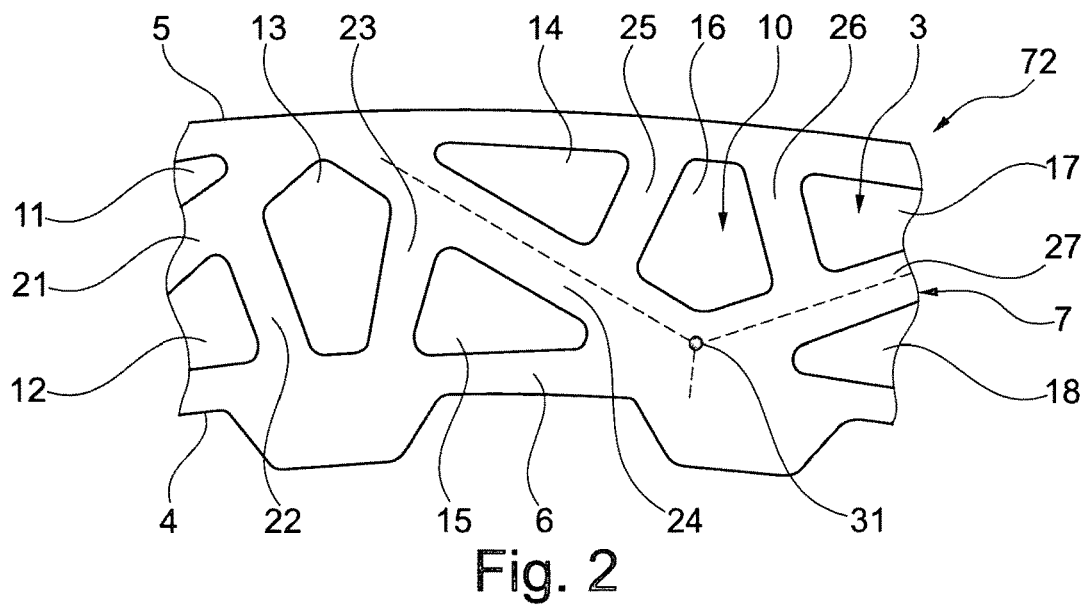
FIGS. 2 to 5 show four exemplary embodiments of frictional parts with modifications of the basic groove pattern shown in FIG. 1.

In FIG. 2, the distances between the friction lining pieces 11 to 18 are somewhat larger than in FIG. 1, so that branching regions 31 result radially inward. The grooves 24 and 27 extend from the branched region 31. The branched region 31 is delimited by the two triangular friction lining pieces 15, 18 and the pentagonal friction lining piece 16.

Figure 3:
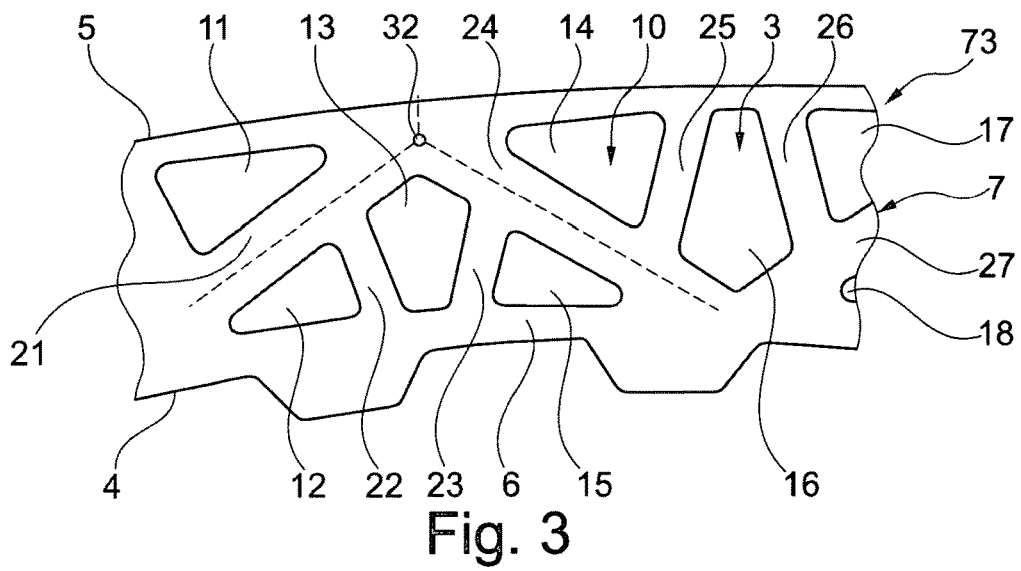

In the case of the frictional part 73 shown in FIG. 3, the distances between the friction lining pieces 11 to 18 are also larger in comparison to FIG. 1 and are selected in such a way that connection regions 32 result radially outward. The grooves 21 and 24 meet in the connection region 32. The connection region 32 is delimited by the two triangular friction lining pieces 11, 14 and the pentagonal friction lining piece 13.

Figure 4:
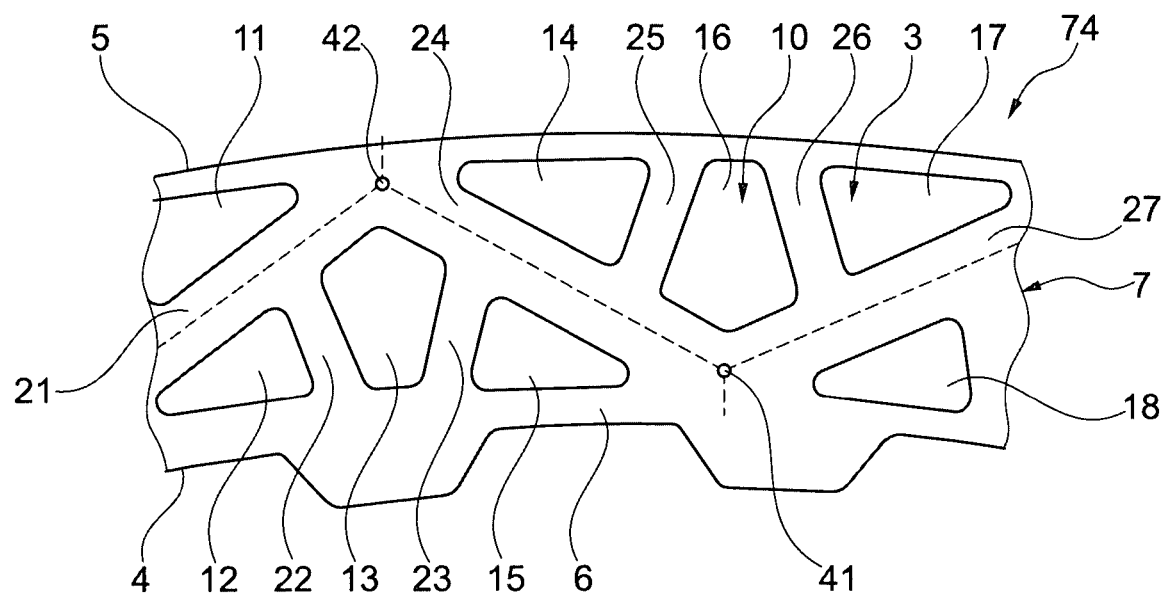
Figure 5:
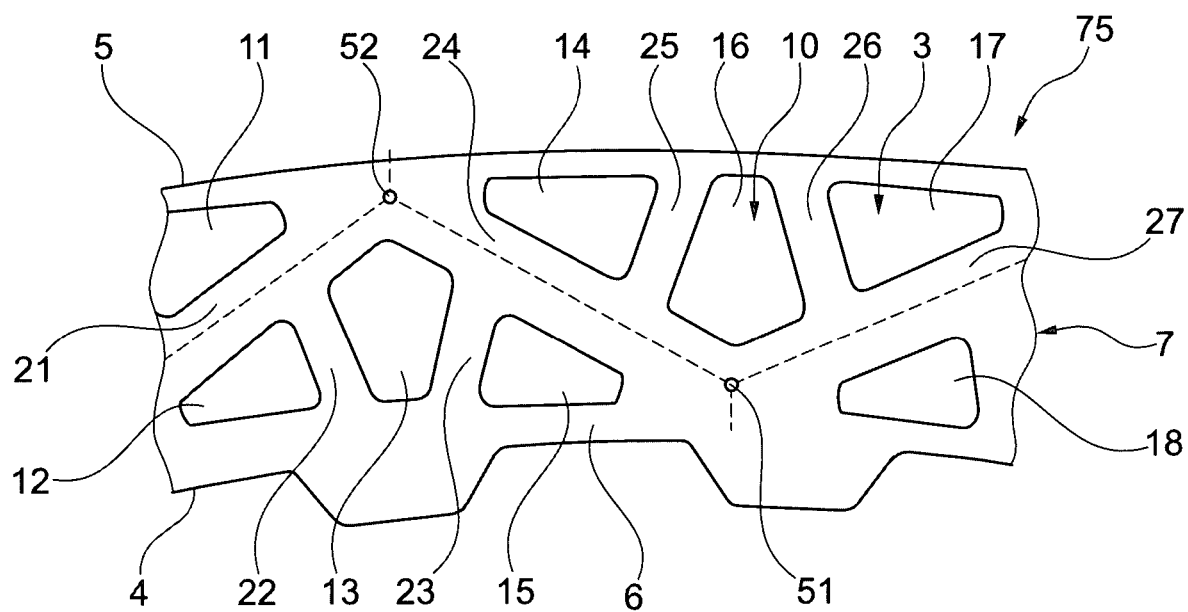

The frictional parts 74 and 75 shown in FIGS. 4 and 5 have radially inward branching regions 41; 51, which correspond to the branched region 31 in FIG. 2. In addition, connection regions 42, 52 are provided radially outward, which correspond to the branched region 32 in FIG. 3.

In the frictional part 75 shown in FIG. 5, the facing tops of the triangular friction lining pieces 11, 14; 15, 18 are more blunt than in FIG. 4. In FIG. 4, all corners of the triangular friction lining pieces 11, 12, 14, 15, 17, 18 are rounded.

REFERENCE NUMERALS

3 Friction Lining
4 Inner Radius
5 Outer Radius
6 Support Element
7 Annular disc
8 Internal Toothing
10 Friction Surface
11 Friction Lining Piece
12 Friction Lining Piece
13 Friction Lining Piece
14 Friction Lining Piece
15 Friction Lining Piece
16 Friction Lining Piece
17 Friction Lining Piece
18 Friction Lining Piece
21 Groove
22 Groove
23 Groove
24 Groove
25 Groove
26 Groove
27 Groove
31 Branched Region
32 Connection Region
41 Branched Region
42 Connection Region
51 Branched Region
52 Connection Region

The invention claimed is:

1. A frictional part for a frictionally operating device, comprising friction lining pieces, which are spaced apart from one another to form an annular disc-like friction surface having grooves, wherein the friction lining pieces have the shape of triangles and convex pentagons, and wherein the convex pentagonal friction lining pieces are oriented with tops of the convex pentagonal friction pieces alternating radially inward and radially outward.

2. The frictional part according to claim 1, wherein the pentagonal friction lining pieces are intrinsically symmetrical with respect to a radial.

3. The frictional part according to claim 1, wherein the triangular friction lining pieces have the shape of acute-angled or right-angled triangles having one short and two longer sides.

4. The frictional part according to claim 1, wherein the triangular friction lining pieces each have a longest side which is arranged radially inward or radially outward.

5. The frictional part according to claim 1, wherein the pentagonal friction lining pieces are each arranged in the circumferential direction between four triangular friction lining pieces.

6. The frictional part according to claim 5, wherein two of the four triangular friction lining pieces comprise respective tops connecting two longer sides, the respective tops directed towards a one of the pentagonal friction lining pieces, while the other two of the four triangular friction lining pieces comprise respective short sides connecting two longer sides, the respective short sides facing the one of the pentagonal friction lining pieces.

7. The frictional part according to claim 1, wherein a branched region is provided radially inward, from which two grooves extend and which is delimited by two triangular friction lining pieces and a pentagonal friction lining piece.

8. The frictional part according to claim 1, wherein a connecting region is provided radially outward, in which two grooves meet and which is delimited by two triangular friction lining pieces and a pentagonal friction lining piece.

9. A groove pattern of the frictional part according to claim 1.

10. A frictional part for a friction lining device comprising an annular disk-like friction surface comprising:
a first plurality of friction lining pieces having a triangular shape;
a second plurality of friction lining pieces having a pentagonal shape, each arranged between four of the first plurality of friction lining pieces in a circumferential direction; and
a plurality of grooves extending between the first plurality of friction lining pieces and the second plurality of friction lining pieces, wherein:
the first plurality of friction lining pieces are acute-angled triangles or right-angled triangles with one shorter side and two longer sides with a longest side directed radially inward or radially outward;
the second plurality of friction lining pieces are symmetrical with respect to a radial and are arranged circumferentially alternatingly with respective top portions directed radially inward or radially outward; and
an adjacent four of the first plurality of friction lining pieces are arranged such that:
two of the four of the first plurality of friction lining pieces comprise a first top connecting the two longer sides directed towards a one of the second plurality of friction lining pieces; and
the other two of the four of the first plurality of friction lining pieces comprise the shorter side directed towards the one of the second plurality of friction lining pieces.

11. The frictional part of claim 7 wherein the plurality of grooves comprises two grooves, each delimited by two of the first plurality of friction lining pieces and one of the second plurality of friction lining pieces, extending from a radially inward branch region.

12. The frictional part of claim 11 wherein the plurality of grooves comprises a one of the two grooves and an additional groove, the additional groove being delimited by a different two of the first plurality of friction lining pieces and a different one of the second plurality of friction lining pieces, meeting at a radially outward connecting region.

13. The frictional part of claim 7 wherein the plurality of grooves comprises two grooves, each delimited by two of the first plurality of friction lining pieces and one of the second plurality of friction lining pieces, meeting at a radially outward connecting region.

14. The frictional part of claim 7 wherein the plurality of grooves comprises two grooves, each delimited by two of the first plurality of friction lining pieces and one of the second plurality of friction lining pieces, extending from a radially inward branch region.

15. The frictional part of claim 7 wherein the plurality of grooves comprises two grooves, each delimited by two of the first plurality of friction lining pieces and one of the second plurality of friction lining pieces, meeting at a radially outward connecting region.

* * * * *